United States Patent

[11] 3,626,364

[72] Inventors Ivan Simon
 Belmont;
 Carl R. Smallman, Lexington; Martin L. Cohen, Belmont; Richard S. Stone, Lexington, all of Mass.
[21] Appl. No. 841,876
[22] Filed July 15, 1969
[45] Patented Dec. 7, 1971
[73] Assignee Arthur D. Little, Inc.
 Cambridge, Mass.

[54] THREE-AXIS SEISMOMETER
 19 Claims, 15 Drawing Figs.
[52] U.S. Cl. .................................................. 340/17, 73/70
[51] Int. Cl. ..................................................... G01v 1/16
[50] Field of Search ............................................ 340/17, 11; 244/3.21; 73/70, 71.1

[56] References Cited
 UNITED STATES PATENTS
 3,480,908 11/1969 Codina .......................... 340/17

FOREIGN PATENTS
1,173,266 7/1964 Germany ...................... 340/17
 OTHER REFERENCES
IBM Technical Disclosure Bulletin Vol. No. 4, No. 5, 10/61 by N. D. Anderson " Recording Vibrations and Shocks."

Primary Examiner—Rodney D. Bennett, Jr.
Assistant Examiner—N. Moskowitz
Attorney—Bessie A. Lepper ABSTRACT: A three-axis seismometer in which three masses are suspended for essentially frictionless movement within certain directions in magnetic fields. Detecting means sense movement of the masses and generate signals used to actuate feedback means. The amount of feedback required is used as a measure of seismic motion. Since motion sensing and the measurement of the magnitude of the motion are separated, output of the instrument may be linear. Responses in unwanted frequency ranges may be filtered out.

PATENTED DEC 7 1971 3,626,364

Ivan Simon
Carl R. Smallman
Martin L. Cohen
Richard S. Stone
INVENTORS

BY *Bernie A. Lepper*
Attorney

PATENTED DEC 7 1971

Ivan Simon
Carl R. Smallman
Martin L. Cohen
Richard S. Stone
INVENTORS

BY *Bernie A. Lipper*
Attorney

Fig. 7

Ivan Simon
Carl R. Smallman
Martin L. Cohen
Richard S. Stone
INVENTORS

Ivan Simon
Carl R. Smallman
Martin L. Cohen
Richard S. Stone
INVENTORS

BY
Attorney

Ivan Simon
Carl R. Smallman
Martin L. Cohen
Richard S. Stone
INVENTORS

Fig. 13

INVENTORS
Ivan Simon, Carl R. Smallman,
Martin L. Cohen, Richard S. Stone

INVENTORS
Ivan Simon, Carl R. Smallman,
Martin L. Cohen, Richard S. Stone

THREE-AXIS SEISMOMETER

This invention relates to a seismometer and more particularly to a small, three-axis, long-period seismometer which may be installed and left unattended for long periods of time.

With few exceptions all seismometers consist of a mass suspended by spring or hinges. The mass is arranged to stay essentially stationary in space as the suspending frame moves with the motion of the earth. Long-period instruments of this type are, of necessity, relatively large and require a considerable amount of auxiliary equipment. Such instruments, although very accurate, must be installed in shallow earth vaults because of their size and shape. This in turn means that when instruments of this nature are operated near the surface, as they must be, they are limited in their performance by having to cope with relatively high-level ground noises at low frequency. To avoid this difficulty it is desirable to place long-period seismometers in deep boreholes, e.g., those which are at least 500 feet deep. However, this is impossible in the case of conventional long-period seismometers, a fact which in turn has led to recent developments in the development of specific borehole seismometers. However, the present seismometers of this type require boreholes 11 to 12 inches in diameter. Since the cost of a borehole is directly related to its diameter, it would be desirable to have a long-period, continuously reliable seismometer which could be installed in boreholes of considerably smaller diameter, e.g., about 5 to 6 inches.

In addition to their use in small diameter boreholes, there are many other demands for small seismometers which are extremely sensitive, which can be relied upon to operate continuously over a long period of time with little or no attention, and which require a minimum amount of auxiliary equipment. The three-axis, long-period seismometer of this invention is capable of filling such demands and is particularly suitable for a small diameter seismometer which can be placed in deep boreholes.

It is therefore a primary object of this invention to provide a novel and improved small diameter seismometer capable of detecting seismic motion in three axes. It is another object of this invention to provide a seismometer of the character described which is suitable for insertion in deep boreholes for connection through a minimum number of leads with auxiliary electronic equipment which may be placed at any suitable remote place. It is another object of this invention to provide a three-axis, long-period seismometer which is extremely sensitive and which at the same time is capable of providing a linear readout. It is yet another primary object of this invention to provide a seismometer of the character described which is adapted for a wide range of uses in a wide range of environments. It is another object of this invention to provide an instrument of the character described which is insensitive to pressure, gravity, and many other physical influences which affect the performance of the prior art seismometers. Other objects of the invention will in part be obvious and will in part be apparent hereinafter.

The invention accordingly comprises the features of construction, combinations of elements and arrangements of parts which will be exemplified in the constructions hereinafter set forth and the scope of the invention will be indicated in the claims.

For a fuller understanding of the nature and objects of the invention reference should be had to the following detailed description taken in connection with the accompanying drawings in which.

The three-axis, long-period seismometer of this invention is formed in three segments, two of which have horizontally oriented elongated diamagnetic masses supported in magnetic fields designed to permit essentially only axial movement of the diamagnetic mass, and the third segment of which comprises a magnetically supported mass affixed to a vertically oriented elongated member. The horizontally oriented masses are used to detect and measure seismic motions in what for convenience may be designated the north-south and east-west directions; while the vertically oriented mass measures seismic motion in the vertical direction. A feedback system is associated with each of these masses and is used to constrain the relative motion of each mass and its associated part of the apparatus in contact with the earth, the seismic movement of which is to be determined. The amount of feedback required for such constraint is a measure of the amount of motion which could have been experienced by each mass and hence is a measure of seismic motion in each of the three axes. Since the amount of feedback is measured in terms of current or voltage required to effect the necessary constraint, and since it can, if desired, be made linear, the measurements of seismic motion may be linear without in any way lessening the sensitivity of the detection of the motion of the masses. Hence, the three-axis seismometer of this invention may, if desired, attain what has heretofore not been considered possible—it can couple extreme sensitivity with linear output.

Figure 1:
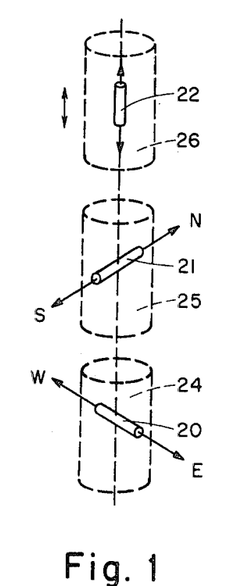
FIG. 1 is a simplified diagrammatic representation of the three levitated masses, the movements of which along their axes are used to measure seismic motions.

FIG. 1 shows in diagrammatic fashion the three masses, 20, 21, and 22, used in the three seismometer segments 24, 25, and 26. Masses 20 and 21 sense and measure seismic motion in the two directions in the horizontal plane, e.g., the east-west and north-south directions; while mass 22 senses and measures seismic motion in the vertical direction. The order of segment arrangement of FIG. 1 may be changed, e.g., the vertically oriented mass segment 26 may be on the bottom or between the two segments 24 and 25.

Figure 2:
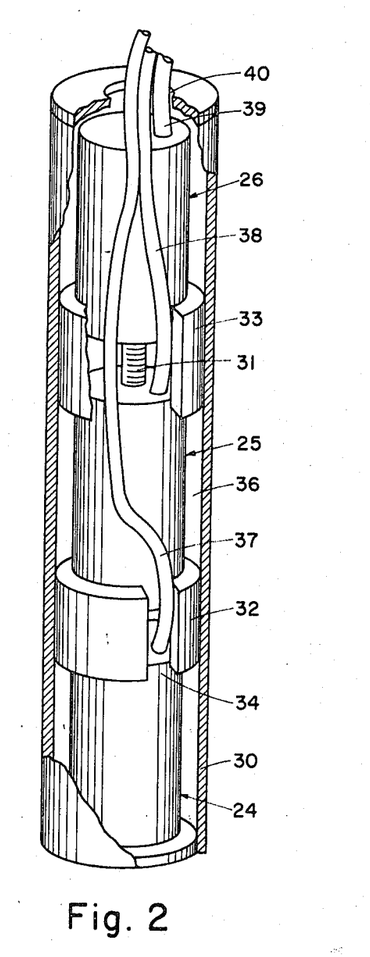
FIG. 2 is a perspective side view, partly cut away, of a three-axis seismometer constructed in accordance with this invention having the three segments in axial alignment.

The embodiment of the apparatus of this invention shown in FIG. 2 is particularly suitable for insertion in boreholes. The three segments, 24, 25, and 26, containing the suspended masses, are positioned within a main cylindrical housing 30, the outside diameter of which is slightly smaller than the diameter of the borehole to be used. The segments 24, 25, and 26 are held firmly together in spaced relationship by a combination of spacers, such as the threaded turnbuckles 31 and two collars 32 and 33 fitted around the ends of the adjoining segments. Another threaded turnbuckle (not shown) joins segments 24 and 25. These collars are relatively thick annular rings having slots, such as slot 34 shown for collar 32, running the entire length of the collar. These collars 32 and 33 position and align the segments 24, 25, and 26 within the housing 30, and define between the segment housings and the inner wall of the housing 30 a series of annular passageways 36 which provide suitable spacings for cables 37, 38, and 39 (carrying the lead wires connecting with remote equipment) to be positioned between the inner wall of the housing 30 and the outer surface of the segment housings. The slots 34 and annular passageways 36 permit the cables to pass through an opening 40 in the top of the main housing 30. Cable 37 associated with the lowest segment 24 would normally lie within the confines of the slot in collar 33. However, in the drawing in FIG. 2 it has been drawn to be separated so that the threaded turnbuckle 31 may be shown.

Figure 3:
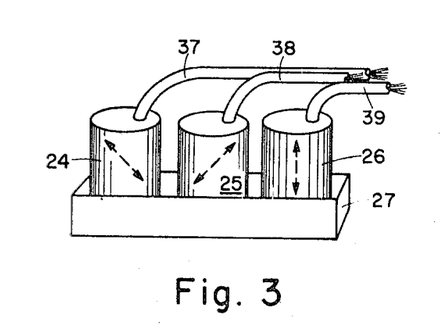
FIG. 3 illustrates a modification in the positioning arrangement of the three segments making up the seismometer of this invention.

FIG. 3, in which like numbers refer to like components in FIG. 2, shows another arrangement of the three segments in which they may be positioned side by side, either directly on the ground or in a housing 27. This, of course, is satisfactory if they are to be placed in a vault or in some similar location, but this arrangement cannot be used in boreholes.

The seismic motion in the east-west or north-south direction is sensed by using a diamagnetic mass suspended in a magnetic field of a particular flux configuration which is such as to constrain the body radially but permits it to move axially within certain predetermined limits. The suspension of the diamagnetic mass in this manner is essentially frictionless, and the apparatus may be constructed to be relatively sturdy and stable over an extended period of time. Inasmuch as the physical phenomena of diamagnetism and magnetism do not depend upon temperature (below the Curie point of the materials), gravity or other physical influences, the horizontal seismometers may be operated over a very wide range of physical conditions. Any axial shift in the diamagnetic mass brought about through the effective displacement of the instrument is measured in the form of the amount of feedback required to maintain the mass within predetermined limits. This requires some means for restoring the mass to its pull position. As will be shown in the detailed description to follow, the horizontal seismometers of this invention also incorporate installation leveling means which may be actuated either manually or mechanically.

Figure 4:
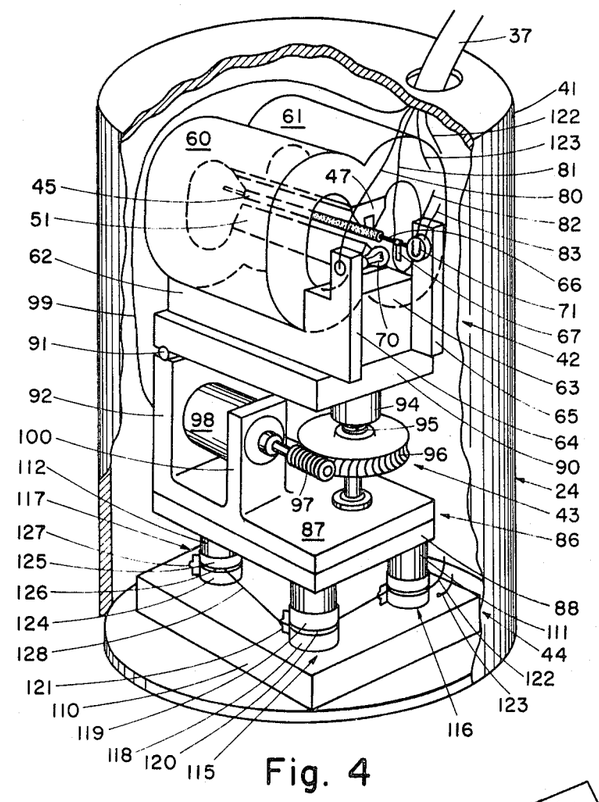
FIG. 4 is a perspective view, with some details omitted, of one of the segments having a horizontally oriented mass.
Figure 5:
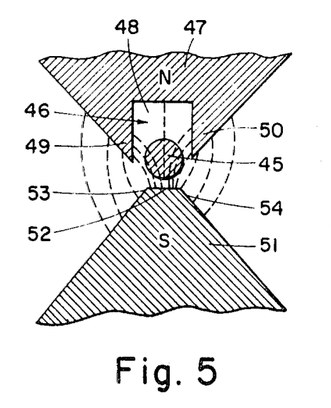
FIG. 5 is an enlarged cross section of a portion of the magnetic field generating means employed in the segment of FIG. 4.
Figure 6:
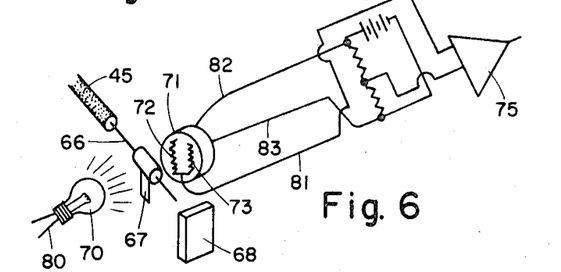
FIG. 6 is an enlarged somewhat diagrammatic view showing a portion of the detecting means used.

FIGS. 4–11 are directed to illustrating various embodiments of the construction and to describing the operation of segments 24 and 25 which contain horizontally oriented diamagnetic masses. These segments 24 and 25 are identical in construction. FIG. 4 is a perspective view of one of these segments with a portion of its housing cut away; FIG. 5 is an enlarged detailed cross-sectional view showing the manner in which the diagmagnetic mass is suspended in a magnetic field; and FIG. 6 illustrates the functioning of a portion of the detecting means. Reference should be had to FIGS. 4–6 in the following description in which seismometer segment 24 is used to illustrate the measurement of seismic motion in the east-west or north-south direction.

The segment 24 is enclosed within a housing 41 which serves as a magnetic shield. This segment may be considered to be made up of three integrated components, namely the main horizontal seismometer 42, the leveling mechanism 43 and the feedback tilter 44.

The manner in which a diamagnetic mass is suspended in a magnetic field may be explained with reference to FIG. 5 which illustrates how a mass of a diamagnetic material, such as an elongated cylinder 45, can be suspended in a properly designed magnetic field 46. In order to achieve the desired levitation of the mass 45, it is necessary to provide a magnetic field which has a vertical gradient decreasing upwardly and which exhibits symmetrical transverse gradients which are substantially uniform. In FIG. 5 the lines of flux have been drawn in to illustrate the flux gradient and from these lines it will become apparent that the magnet is so arranged as to strongly constrain the diamagnetic mass in a transverse direction while leaving it free to move with essentially no friction in the axial direction. As will become apparent in the following detailed description, the axial movement is constrained and the magnitude of the signal (e.g., the amount of voltage or current) required to effect such constraint becomes a measure of the deviation that the suspended mass would normally undergo from a true horizontal plane.

The desired magnetic field is achieved by use of an upper pole piece 47 in which there is a groove 48 having edges 49 and 50 which, according to well-known physical principles, effect a concentration of the magnetic flux. A lower pole piece 51 is provided and in the modification of FIG. 5 is seen to terminate in a narrow, flat surface 52 which provides edges 53 and 54 so aligned with edges 49 and 50 as to achieve the desired lateral flux gradient as well as a vertical gradient. It will be appreciated that these edges need not be sharp but may be rounded to optimize magnetic saturation in the pole piece material.

As seen in FIG. 4, the pole pieces 47 and 51 are affixed to two integrated permanent magnets 60 and 61. These in turn are mounted in a horizontally positioned seismometer frame 62 which on one end has a relatively thick vertical piece 63 serving as a means to position two vertical support members 64 and 65. The diagmagnetic mass 45, typically a rod of graphite, has affixed to one end a thin lightweight rod 66 which serves as a support for lightweight, light-obstructing vane 67, which is part of the detecting system shown in somewhat enlarged diagrammatic detail in FIG. 6. An end stop 68 is provided to engage the end of rod 66 to limit the travel of the diamagnetic mass (FIG. 6). A similar end stop (not shown) is associated with the other end of the mass.

Affixed to vertical support 64 is a miniature light bulb 70 providing a source of radiation. Affixed to vertical support 65 is a dual photoresistive photocell 71. The radiation source 70, the light-obstructing vane 67 and the photocell 71 are so arranged that when the apparatus is positioned to be truly horizontal the vane 67 divides the radiant energy striking the photocell equally between the two sides of the photocell. As will be seen from FIG. 6, if the position of the vane shifts relative to the position of the photodetector by virtue of the fact that the frame 62 has moved with the earth, the amount of radiation falling on the light-sensitive elements 72 and 73 will be different. This difference is then reflected in the amount of current delivered to an amplifier 75 through the circuit illustrated. The use of the signal derived from amplifier 75 will be explained in detail in connection with the description of the feedback mechanism for the segment. Lead wires 80 (shown as a single wire) connect the lamp to a suitable power source; while lead wires 81, 82, and 83 connect cell 71 with its associated circuit. These lead wires are taken through cable 37 for connection to equipment as described in connection with FIG. 7.

Inasmuch as the apparatus of FIG. 4 is particularly suitable for incorporation in a three-axis seismometer to be inserted into a deep borehole, it is advantageous to have means for leveling the seismometer after installation, the actual leveling being controlled at a location quite remote from the location of the seismometer itself. The horizontal seismometer of FIG. 4 is equipped with leveling means 43 which may be manually or automatically operated. The seismometer frame 62 is supported on a tiltable platform 90 having a groove in its bottom surface adapted to engage a pivot pin 91 for pivotal motion along an edge to permit alignment of the seismometer frame 62. The pivot pin 91 in turn rests in another corresponding groove in the vertical component 92 of an intermediate support system 86 illustrated in FIG. 4 to be formed of plates 87 and 88. The actual pivoting of the platform 90 is achieved through a nut 94, and a fine-pitch screw 95 which in turn is driven by a gear 96 and worm 97, the latter being turned by a leveling motor 98 which is connected through lead wires 99 to signal-control means shown in FIG. 7 as motor control circuit 101. The motor 98 is conveniently supported in an auxiliary vertical support 100. By manually or automatically operating the motor 98, it is possible to adjust the platform 90 by pivoting it on pivot pin 91 and hence to level the diamagnetic mass 45. Through the use of the motor control circuit 101 in FIG. 7, automatic operation (leveling) is accomplished by operation of polar relay 102 through threshold device 103 when the output signal approaches the maximum value that the circuits can provide. The contacts 104 and 105 of this polar relay 102 are connected in parallel with those of the manual leveling switch 106 and thus automatic leveling is provided whenever a large deviation from the null position exists.

The feedback tilter system 44 illustrated in FIG. 4 is one which incorporates piezoelectric crystals to automatically adjust platform 90 with respect to the position of diamagnetic mass 45. This is accomplished by interposing a piezoelectric system between the intermediate support system 86 and the base plate 110 through brass rings 111 and 112. The baseplate 110 is, in effect, connected to the ground, the seismic motion of which is to be measured. This connection is normally through the structure illustrated in FIG. 2.

In the embodiment of FIG. 4 the feedback tilter is a piezoelectric three-point suspension system comprising three piezoelectric assemblies, namely the two front assemblies 115 and 116 and the single back assembly 117. Each of the two front assemblies, 115 and 116, are, for simplicity of illustration, shown to be formed of two piezoelectric crystals, 118 and 119, having an electrode 120 located between them. These two piezoelectric crystals are connected for grounding by wires 121 and are poled so that they contract when a voltage is applied to the electrode 120 connected to appropriate circuitry (described below) through lead wires 122 and 123. The single-back piezoelectric assembly 117 is likewise shown in its simplest form to comprise two piezoelectric crystals 124 and 125 with an electrode 126 and grounding wire 127. The two front electrodes 120 and back electrode 126 are connected through lead 128. The piezoelectric assemblies 115, 116 and 117 may be formed of any even number of crystals in accordance with well-known techniques. Thus if the front assemblies 115 and 116 are poled to contract when voltage is applied to electrode 120, the back assembly crystals will be poled to expand when voltage is applied to electrode 126.

In a similar manner the piezoelectric crystal can be arranged to impart lateral, rather than angular, motion to frame 62. In such a modification, the relative motion of the seismic mass with respect to the field generating means is restored by inertial forces rather than by gravitational forces as in the arrangement of FIG. 4.

Signals received from the amplifier 75 control, through a feedback circuitry to be described, the amount of voltage which is delivered to the electrodes 120 and 126, and hence control the orientation of the platform mechanism on which the seismometer rests. Lead wires 122 and 123, along with lead wires 80, 81, 82, 83, and 99, are combined in a single cable 37 for connection with the electronic components to be described below.

Figure 7:
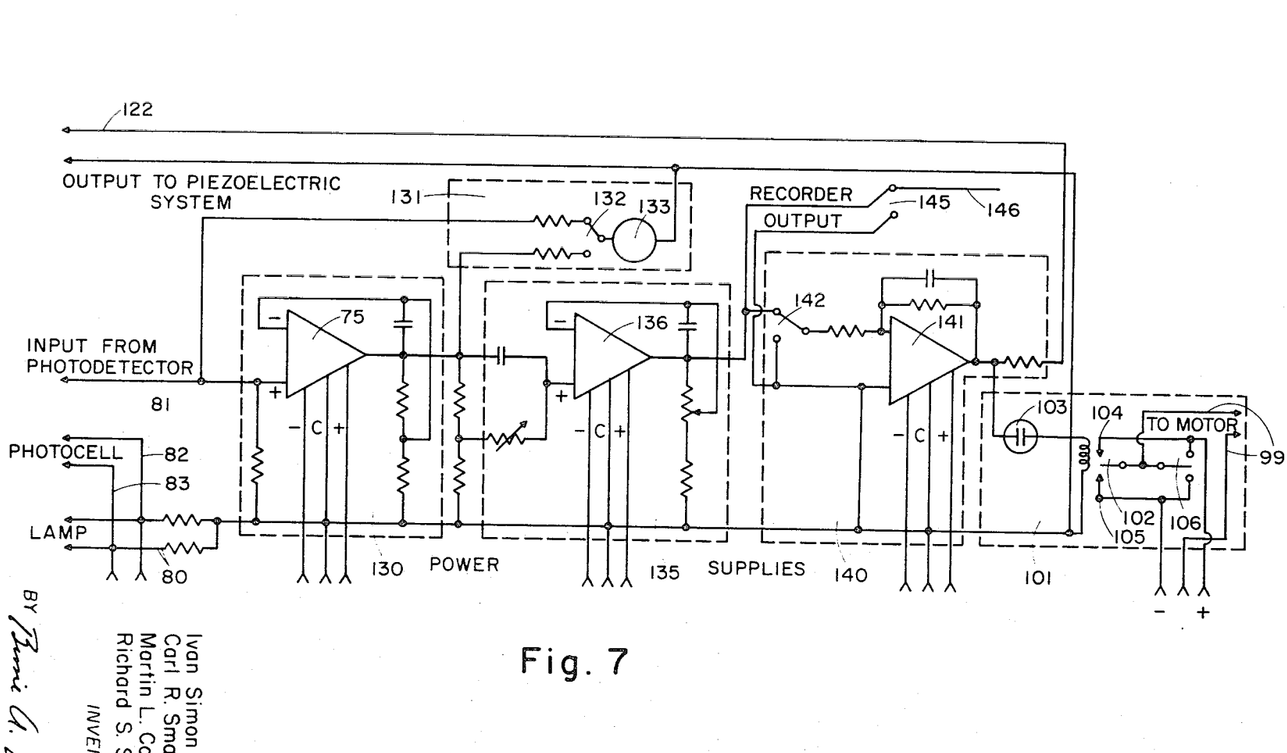
FIG. 7 is a detailed circuit diagram of the embodiment of a portion of the circuitry associated with the seismometer segment of FIG. 4.

FIG. 7 is a diagram for the feedback circuit of the apparatus of FIG. 4. Like numbers refer to like components in FIGS. 4 and 6. As explained, the photodetecting system, such as shown in FIG. 6, measures the amount of seismically induced motion in the frame and its supporting systems. The purpose of the feedback mechanism is to constrain the motion of the diamagnetic mass and this is done by shifting the position of the frame and hence the position of the magnetic field generating means, e.g., the magnets and pole pieces, relative to the freely suspended diamagnetic mass to that it will remain in its null position. The voltage required to effect this constraint is a measure of the seismic motion. Therefore, in the case of the apparatus of FIG. 4, the voltage input to its associated amplifier 141 (described below) is the measure of the seismic motion.

One exemplary circuit capable of automatically effecting the required constraint is shown in the embodiment of FIG. 7. The signal transmitted via lead wires 81, 82, and 83 from the photodetector system (FIG. 6) is fed to a preamplifying circuit 130 which includes amplifier 75. This signal may be visually monitored, if desired, through a monitoring circuit 131 including a switch 132 and microammeter 133. It is desirable to incorporate a response-adjusting circuit 135 (which includes an amplifier 136) for error-rate damping, maintaining stability or for otherwise modifying the overall response prior to its transmittal to the voltage amplifier circuit 140 which in turn includes an amplifier 141 and switch 142. Inasmuch as the voltage transmitted to the voltage amplifier circuit is a measure of the seismic motion, this voltage also becomes the signal delivered to a recorder and any other signal-actuated means as described in conjunction with FIG. 15. Such signal-actuating means are attached through switch 145 and line 146. The voltage amplifier circuit provides a voltage which is proportional to the signal received from the photodetector system and this signal is used to control the voltage input to electrodes 120 and 126 of the piezoelectric system. Since the crystals of piezoelectric assemblies 115 and 116 are poled to contract when voltage is applied and piezoelectric assembly 117 is poled to expand under the same condition, the signal from the voltage amplifier circuit controls the degree to which the intermediate support system 86 is adjusted to maintain seismometer frame 62 in the desired position relative to diamagnetic mass 45. Thus, for example, if the seismic motion is such as to displace frame 62 with respect to the mass 45 in a given direction, then the feedback circuit provides a voltage to the electrodes of the piezoelectric assemblies which tilts the frame by an amount necessary to allow gravity to restore the relative position of the mass and frame.

While the voltage amplifier and piezoelectric assembly system of the apparatus of FIG. 4 are designed to restore the relative position of the diamagnetic mass with respect to the frame by tilting the entire assembly, the embodiments illustrated in FIGS. 8–11 are designed to apply magnetic or electrostatic forces to the diamagnetic mass itself to restore it to a null position and to use the amount of this force required as a measurement of the seismic motion experienced. The embodiments of FIGS. 8 and 10 use magnetic force while that of FIG. 11 uses electrostatic force.

Figure 8:
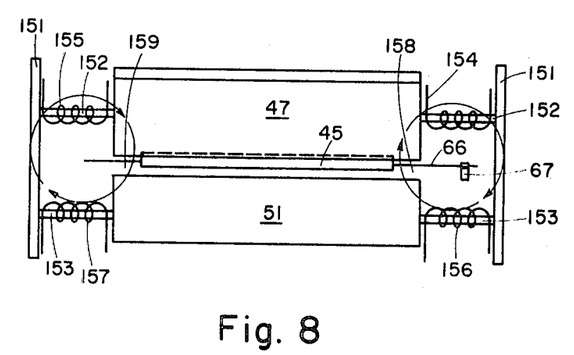
FIGS. 8 through 11 are diagrams of additional feedback system embodiments, those of FIGS. 8–10 using magnetic forces and that of FIG. 11 using electrostatic forces.
Figure 9:
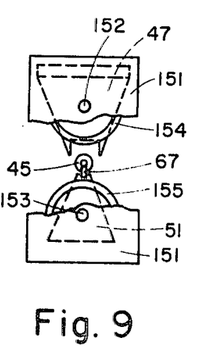

In the embodiment of FIG. 8 the pole pieces and photodetecting means are the same as in FIG. 4. Affixed across each end of the pole pieces 47 and 51 is an iron plate 151 held by upper nonmagnetic spools 152 and lower nonmagnetic spools 153. Coils 154 and 155 are wound around the upper spools 152 and coils 156 and 157 are wound around spools 153. In operation, a signal from the photodetector system is delivered to amplifier 75 (FIG. 7) and returned to the seismometer. However, in the embodiment of FIGS. 8 and 9, the returning signal takes the form of current to the coils. If for example the diamagnetic mass 45 has moved axially to the right, the feedback signal is in the form of additional current to coils 154 and 156. The magnetic field in the area designated 158 is strengthened, the diamagnetic mass is repelled and caused to shift toward the left to its null position. At the same time current is applied to coils 155 and 157 to weaken the magnetic field in the area designated 159, thereby enhancing the effect. In like manner the current signal to coils 154, 155, 156, and 157 can be reversed to effect a constraining force when the mass attempts to shift to the left. The seismometer of FIGS. 8 and 9 may be positioned on a level-adjustable platform and used as in FIG. 4. However, the intermediate platform system 86 and piezoelectric system are eliminated.

Figure 10:
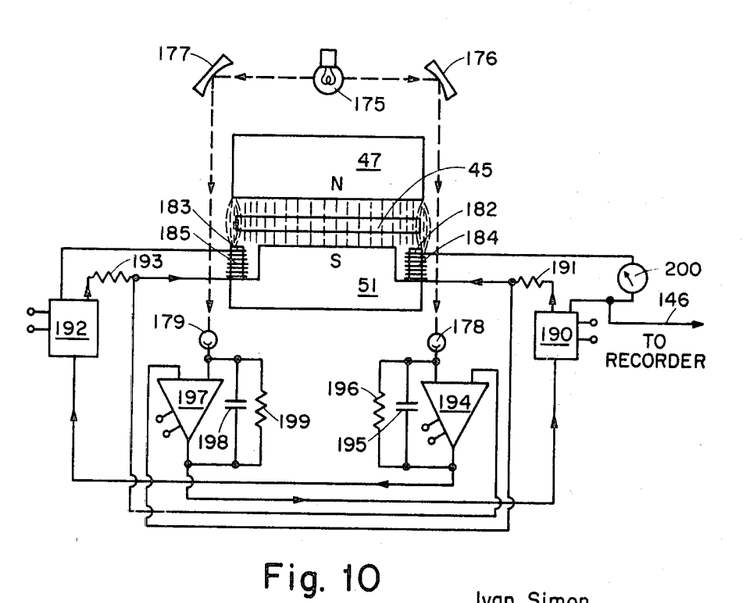

In the embodiment shown diagrammatically in FIG. 10 the restoring force is magnetic and the detecting system is modified to include two separate photocells and to eliminate the light-obstructing vane.

In the device of FIG. 10, the optical portion of the detecting means includes a radiant energy source 175 and two mirrors 176 and 177 aligned with photocells 178 and 179. The lower pole piece 51 is modified at either end to include electromagnets 182 and 183 having coils 184 and 185, respectively. In like manner, the upper pole piece 47 may be so modified to include electromagnets in addition to or in place of the electromagnets 182 and 183 associated with the lower pole piece.

Coil 184 is connected to a circuit which includes a current amplifier 190 and resistor 191; and in like manner, coil 185 is part of a circuit including current amplifier 192 and resistor 193. Photocell 178 is connected to a differential amplifier 194 which has a feedback loop comprising capacitor 195 and resistor 196 in parallel; and photocell 179 is connected to a differential amplifier 197 which has a feedback loop comprising capacitor 198 and resistor 199 in parallel. It will be seen that differential amplifier 194 is also connected to current amplifier 192 and coil 185; while differential amplifier 197 is connected to current amplifier 190 and coil 184, the connections between the differential amplifiers and the coils providing current feedback loops. A DC current is provided to the amplifiers in the usual manner from a source not shown.

In the operation of the seismometer of FIG. 10, currents are passed through both coils 184 and 185 in a direction such as to reinforce the fields generated by the permanent magnets associated with the pole pieces. The fields at the ends of the pole pieces are thus made stronger similar to the situation shown in FIGS. 8 and 9. Now, if one of the currents in either coil 184 or 185 is made stronger, the stronger field generated by the corresponding electromagnet will push the diamagnetic mass toward the center of the suspension; similarly, making the current weaker will permit the diamagnetic mass to move outwards, away from the center.

If the seismometer is displaced so that the mass 45 shifts, say, to the right, the left-hand photocell 179 receives more light, and the left-hand differential amplifier 197 generates larger output voltage. This voltage is fed into the right-hand current amplifier 190 causing it to pass stronger current through the coils 184 on the right and the mass is constrained. In a manner similar to that described for the operation of the system of FIG. 8, this effect is enhanced by weaking the field on the other end.

The current feedback loop delivers a voltage proportional to the constraining current to the other input of left-hand differential amplifier 197 and causes the mass promptly to reach the initial zero position to be held there as long as there is any displacement of the seismometer. As in the other embodiments illustrated, the amount of constraining current is a function of the seismic motion and it may be read from milliammeter 200 and fed to a chart or computer by line 146 as described below in conjunction with the discussion of FIG. 15.

Figure 11:
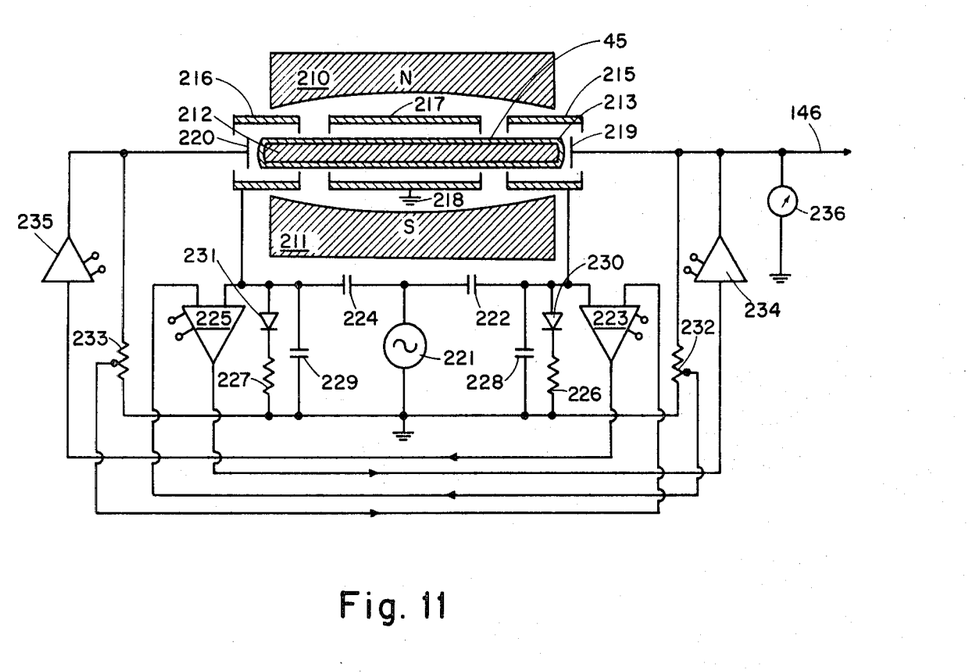

The embodiment FIG. 11 employs a capacitance displacement detection system and an electrostatic constraining force resulting from applying a voltage to electrodes located near the ends of the diamagnetic mass. In the arrangement of FIG. 11 two modified pole pieces 210 and 211, designed to bring about a more gradual change of the flux gradient by reason of their concave configuration, are arranged to cause the required constraining force to increase proportionally with the displacement of the diamagnetic mass from null position. The diamagnetic mass 45 is a graphite rod 212 with a copper sheath 213. Interposed between the mass 45 and the pole pieces are two end cylindrical electrodes 215 and 216 and a central electrode 217, this last electrode being connected to ground 218. Electrostatic forcer electrodes 219 and 220 are positioned within the terminal electrodes 215 and 216, and they are made part of a feedback system which functions similarly to that of FIG. 10. This feedback system is comprised of an AC source 221 and a capacitor 222 and differential amplifier 223 associated with terminal electrode 215; and of a capacitor 224 and differential amplifier 225 associated with terminal electrode 216. The differential amplifiers 223 and 225 are provided with feedback loops comprising resistors 226 and 227 and capacitors 228 and 229 in parallel which have suitably long-time constants.

The charged electrodes 219 and 220, of whatever polarity, will induce charges of equal size and opposite polarity on the surface adjacent to the electrodes. Thus, the charging of one of the electrodes will cause the mass 45 to be attracted to that electrode. In this way it is possible to exert force on the mass in order to counteract its motion caused by displacement of the seismometer and the amount of the force required is a measure of the seismic motion experienced. Since the displacement detection system employs AC current rather than DC, the imbalance in voltage in either side of the system is rectified by diodes 230 and 231 before it is applied to the input of the corresponding differential amplifier. In the feedback loops of this system, the feedback voltages are derived from resistive voltage dividers 232 and 233 connected to control electrodes 219 and 220; and voltage amplifiers 234 and 235 are provided in the electrostatic forcer electrode circuits. A millivoltmeter 236 is illustrated as representative of means for reading out the axial movement of the diamagnetic mass and line 146 connects the seismometer to a chart recorder and other signal-actuated means as described in conjunction with FIG. 15.

Figure 12:
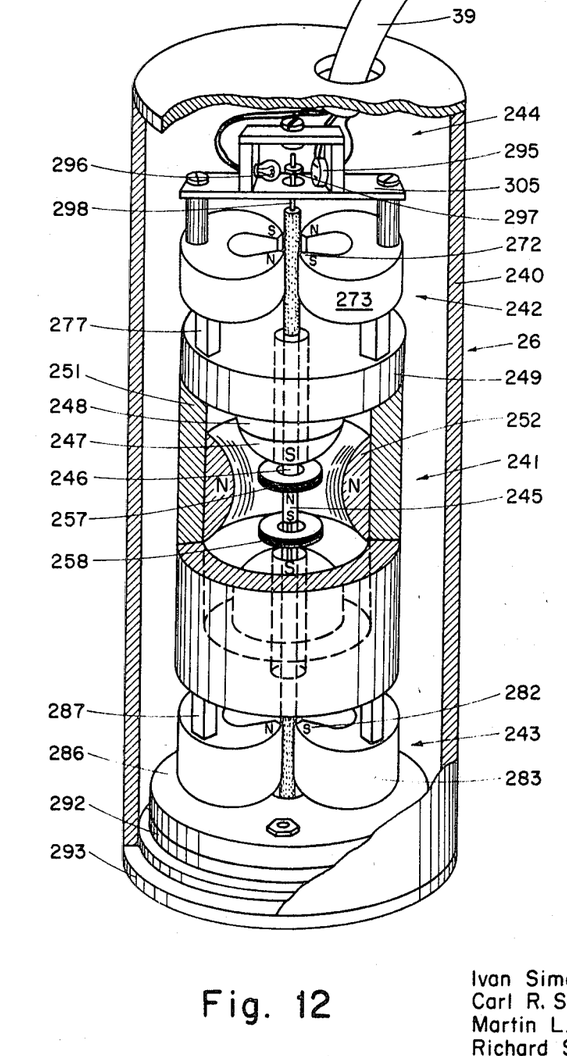
FIG. 12 is a perspective view, with some details omitted, of the seismometer segment having a vertically oriented mass.
Figure 13:
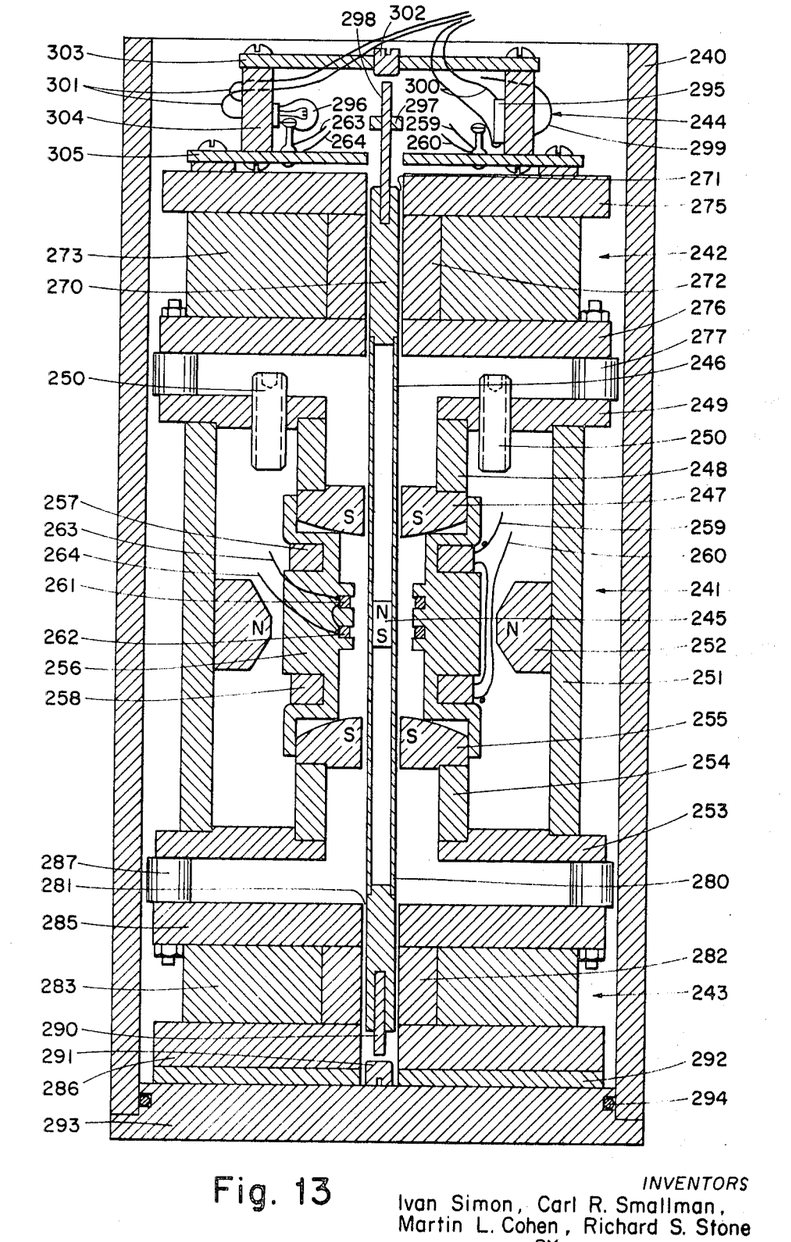
FIG. 13 is a longitudinal cross section of the seismometer segment of FIG. 12 showing its detailed construction.
Figure 14:
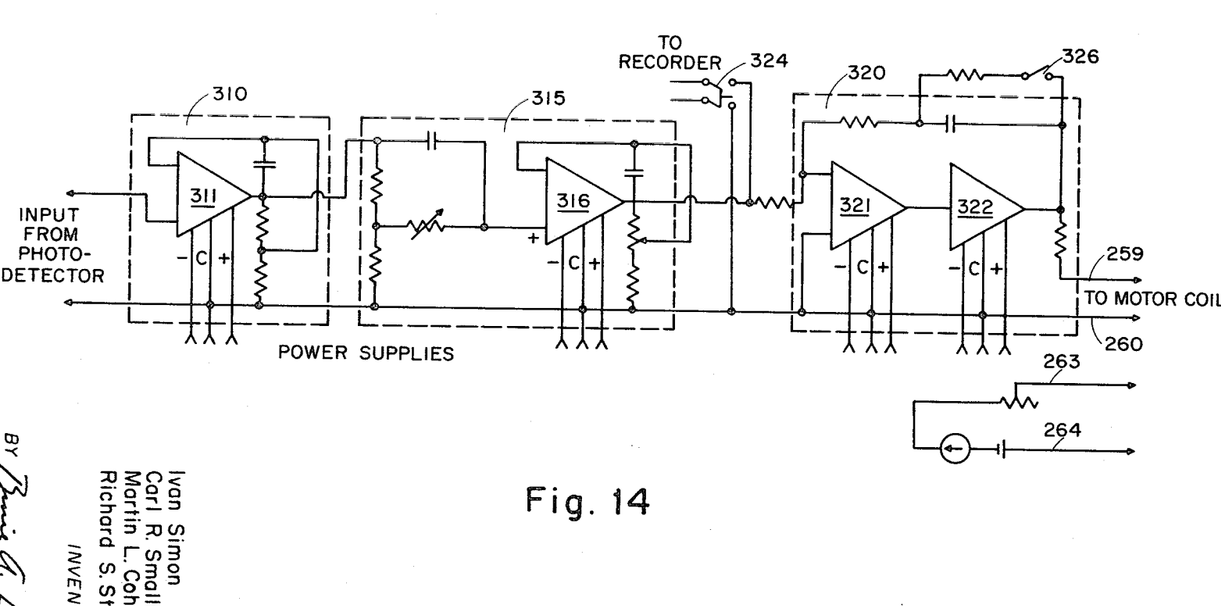
FIG. 14 is a detailed circuit diagram of one embodiment of a portion of the circuitry associated with the seismometer segment of FIG. 11.

FIGS. 12-14 illustrate in detail the construction of a preferred embodiment of segment 26, i.e., that seismometer component employed to measure seismic motion in the vertical axis. A mass mounted on an elongated rod is suspended in a vertical orientation in a magnetic field which permits relative motion of the mass and its associated structure along the axis of the mass. The mass and rod are maintained in alignment through the use of diamagnetic bearings which are essentially frictionless. A photodetector system generates a signal which is used to actuate a feedback system which is magnetic in character.

FIG. 12 is a perspective view of the vertical seismometer segment 26 with the housing and flux tube partly cut away and some components removed; while FIG. 13 is a detailed cross section of the same apparatus. Reference should be had to both of these drawings in the following description.

The vertical seismometer is positioned within a housing 240 which serves as a magnetic shielding. It may be considered to be divided into four components, namely the seismic mass and its suspension means 241, an upper diamagnetic bearing 242, a lower diamagnetic bearing 243 and a detector system 244.

In the embodiment of FIGS. 12 and 13 the seismic mass 245 is a permanent magnet which is encased in a thin-walled stainless steel tubing 246. Suspension of the magnet mass 245 is by means of a magnetic field having a vertical gradient along the axis of the seismic mass. A reentrant magnetic (e.g., iron) circuit containing pole pieces shaped in the form of a hyperboloid of revolution creates the required magnetic suspension field. The magnetic circuit is made up of an upper pole piece cap 247, an upper permanent ring magnet 248, and upper flux return plate 249, with flux shunt adjustment screws 250, a flux return tube 251, a pole piece ring 252 (centrally positioned within said flux return tube) a lower flux return plate 253, a lower permanent ring magnet 254 and a lower pole piece cap 255. With the seismic mass and the poles of the magnets oriented in the manner shown, the mass (along with the tubing 246 and the components affixed to the ends of the tubing associated with the diamagnetic bearing) is freely supported by a combination of attracting and repelling magnetic forces.

Positioned between pole piece caps 247 and 255 is a coil-holding framework piece 256 formed of a suitable nonmagnetic material such as a synthetic resin and shaped in an essentially annular configuration having a series of coil-supporting recesses. The first set of such coils, i.e., motor coils 257 and 258 are those associated with the feedback mechanism designed, as in the case of the horizontal seismic masses, to constrain the relative motion of the mass and the structure surrounding it. Motor coils 257 and 258 are connected in series opposition through lead wires 259 and 260 to the feedback circuitry (FIG. 14) and their purpose is to exert force on the suspending magnet system when energized by the feedback mechanism.

The second set of coils, i.e., coils 261 and 262 which are positioned about the seismic mass may be referred to as period-adjustment coils. They are connected in series opposition by lead wires 263 and 264 to a constant current source (FIG. 14). The purpose of these period-adjustment coils is to produce a spatially localized gradient in the field to create a small perturbation which in turn prevents the mass from being supported in a field of indifferent equilibrium and infinite period. By energizing these coils with a DC current the mass oscillates with a period which is proportional to the current applied to coils 261 and 262.

Associated with each end of the stainless steel tube, which serves as a mounting and aligning means for the seismic mass, is a diamagnetic bearing assembly. The bearings maintain the tube and hence the mass in precise vertical alignment while permitting frictionless up and down movement. Since the upper and lower diamagnetic bearing assembly 242 and 243 are identical in construction, the upper diamagnetic bearing 242 may be described as exemplary.

A diamagnetic mass 270, e.g., a rod of graphite is affixed to the upper end of tube 246. This mass is positioned within an opening 271 defined by a plurality e.g., four) quadrupole pole pieces 272 of quadrupole permanent magnets 273. These magnets 273 are arranged circumferentially to alternate in polarity so as to define within opening 271 a magnetic field, the flux intensity of which decreases rapidly from the surface of the magnets to the center of the established field. This then forms a diamagnetic bearing wherein the diamagnetic mass 270, acting as a shaft is maintained in spaced relationship and out of contact with the magnet surfaces. Since the diamagnetic mass is repelled by the magnetic field, the tube 246 is maintained in axial alignment without any surface contact being made between the shaft 270 and the sleeve defined by the magnet surfaces. The quadrupole magnets 273 are held between an upper flange 275 and a lower flange 276 which in turn is supported by a coupling spacer 277 on the flux return plate 249.

In like manner, the lower diamagnetic bearing assembly 243 is formed of a diamagnetic rod 280 affixed to the lower end of tubing 246, positioned within an opening 281 defined by pole pieces 282 affixed to magnets 283. Upper flange 285, lower flange 286 and coupling spacers 287 hold the magnets in position relative to flux return plate 253.

An end stop rod 290 is inserted into the lower diamagnetic rod 280 for engagement with a lower end stop 291 to terminate the downward travel of the seismic mass. The end stop is mounted in a spacer plate 292 which is affixed to a base plate 293, which in turn is sealed to housing 240 through an o-ring and serves as the bottom of housing 240. Baseplate 298 in effect contacts the ground, the seismic motion of which is to be measured. This contact may be direct; but as in the apparatus of FIG. 2 it is usually made through seismometer housing 30.

The seismic motion detector system 244 is located in the upper portion of the apparatus. It is similar in operation and construction to that of FIG. 6 and is based upon the use of a dual photocell 295, a source of radiation such as miniature lamp 296, and a light-obstructing disk 297 affixed to an end stop rod 298 which is mounted in diamagnetic rod mass 270. Leads 299 (corresponding to leads 82 of FIG. 6) connect the photocell with a power supply. Leads 300 transmit the detector signal to the feedback circuit as described below in connection with FIG. 14. Wires 301 connect the lamp 296 to the power source.

The upper end stop rod 298 has an upper end stop 302 mounted in a stop plate 303 which is supported by posts 304 above a terminal board 305 from which lead wire 259, 260, 263 and 264 are drawn to be passed with leads 299, 300 and 301 through cable 39.

The feedback circuit associated with the vertical seismometer and shown in FIG. 14 is similar to that associated with the horizontal seismometer segments as illustrated in FIG. 7. Thus in FIG. 14 the circuit comprises a preamplifying circuit 310, with amplifier 311; a response adjusting circuit 315 with amplifier 316; and a motor coil-driving circuit 320 with amplifiers 321 and 322. A switch 324 is provided to connect in a recorder by leads 325, and a switch 326 provides an integrating action which minimizes any initial null position error.

In operation, the seismic mass 245 is positioned in its null position and then sufficient DC current is put into the period-adjustment coils to establish a desired period of oscillation to the mass. When the ground with which baseplate 293 is in contact moves, the apparatus moves while the suspended mass tends to remain fixed, thus in effect altering the alignment of light source 296, light-obstructing disk 297 and dual photocell 295. The signal transmitted by cell 295 is fed back into coils 259 and 260 in a manner to constrain mass 245 so as to effectively force it to remain in its null position, the amount of current required to effect this mass constraint being proportional to the seismic motion experienced.

Figure 15:
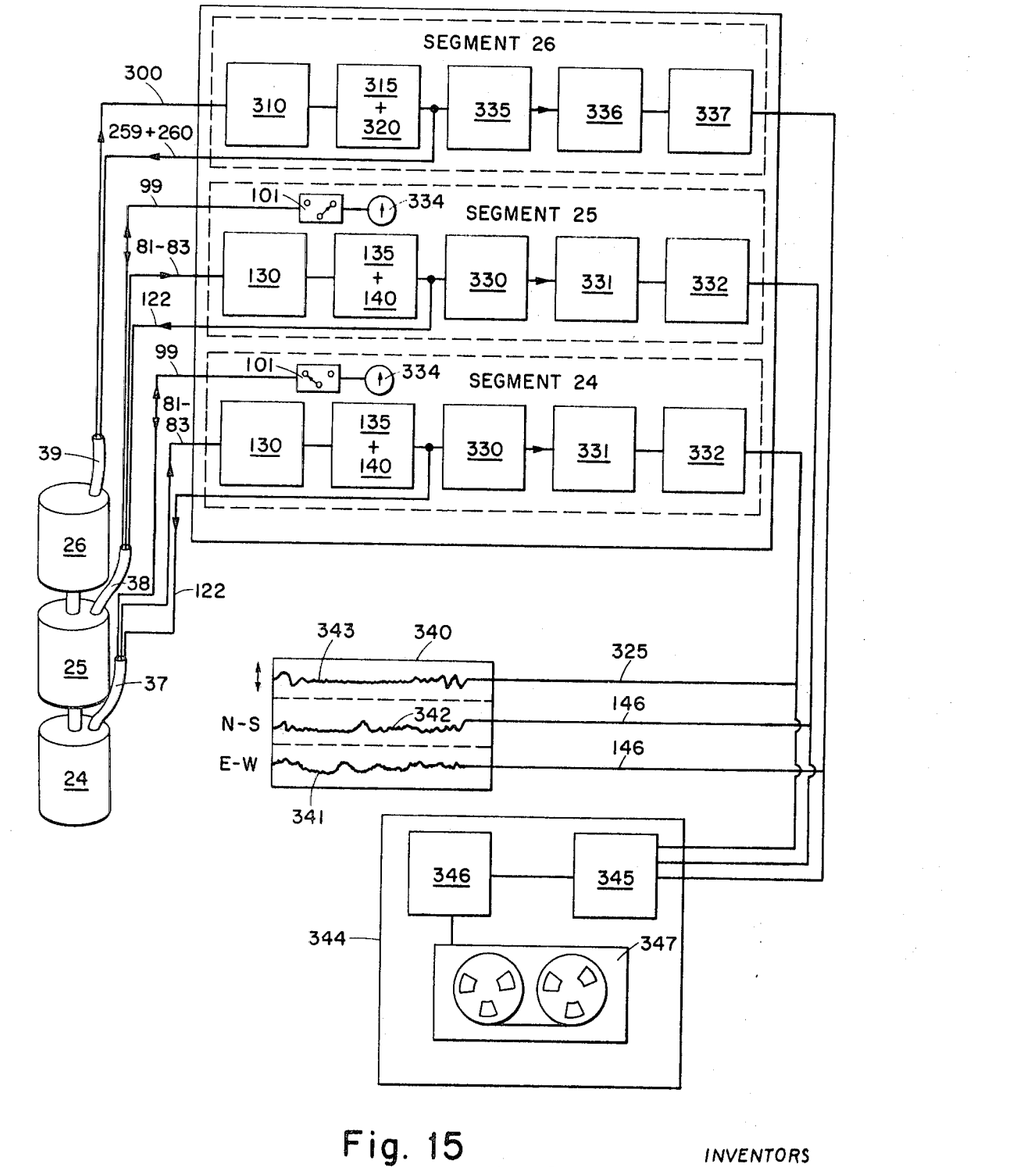
FIG. 15 is a diagrammatic representation of the entire apparatus including recorder and readout means.

The integration of the circuitry of the three seismometer segments is illustrated diagrammatically in FIG. 15 wherein like components are given like reference numbers in FIGS. 2, 7, 12, 13, and 14. In order to simplify the diagram, only the leads (shown as one line) from the detecting devices and to the feedback systems are shown along with the leads to the leveling motors for segments 24 and 25.

In addition to the feedback circuitry shown in FIG. 7 the horizontal seismometer segments are shown to have, in series, a first optional additional amplifier 330, a filter 331, and a second additional amplifier 332. The motor control circuit 101 and ammeter 335 are shown to be connected with the leveling motor 98 and it is to be understood that either manual or automatic operation of motor 98 is contemplated as described previously.

In a similar manner the circuitry associated with the vertical seismometer segment is shown to include an optional first additional amplifier 335, a filter 336 and a second additional amplifier 337. The filters permit the elimination of responses in undesirable frequency ranges, thus screening the information transmitted to the chart recorder 340 as well as to the automatic data processing and storing mechanism 344. Seismic motions in all three axes are recorded simultaneously as illustrated by records 341, 342 and 343. At the same time the information from each seismometer circuitry is transmitted to a multiplexer 345, then to an analog-to-digital converter 346 and finally to a suitable digital recorder 347.

The three axis, long-period seismometer of this invention is both sturdy and sensitive. Because it is very compact and requires a minimum number of connections with any desired recording and readout means, it may be located in almost any place required. Finally since the seismometer of this invention is essentially uneffected by changes in physical conditions surrounding it, it may be installed and then left unattended for extended periods of time.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:
1. A three-axis seismometer, comprising in combination
   a. first and second horizontally oriented diamagnetic masses arranged to move in directions perpendicular to each other;
   b. first and second magnetic field generating means adapted to support said first and second diamagnetic masses for essentially only axial movement;
   c. a third vertically oriented mass;
   d. a third magnetic field generating means adapted to support said third mass for essentially only axial movement;
   e. separate detecting means associated with each of said masses adapted to sense relative seismic motion of said mass and magnetic field generating means and to produce a signal; and
   f. separate feedback means associated with each of said masses and its respective magnetic field-generating means, each of said feedback means being adapted to receive said signal from said detecting means and to constrain said relative motion between said mass and its magnetic field generating means, the amount of constraint required being related in a predetermined manner to the magnitude of said seismic motion.

2. A three-axis seismometer in accordance with claim 1 wherein said constraint is effected through magnetic, electrostatic, inertial or gravitational forces, or in a combination thereof.

3. A three-axis seismometer in accordance with claim 1 wherein said first and second masses are elongated rod members and each of said first and second magnetic field-generating means comprises an upper pole piece defining a horizontal channel and a lower pole piece of a configuration to define with said upper pole piece a magnetic field having a flux concentration which is essentially symmetrical along the axis of said mass and which exhibits vertical and transverse gradients whereby said mass is strongly constrained transversely but is free to move axially.

4. A three-axis seismometer in accordance with claim 1 wherein said third mass is a ferromagnetic body so oriented within a magnetic field as to be supported by a combination of magnetic attraction and magnetic repulsion.

5. A three-axis seismometer in accordance with claim 1 wherein said vertically oriented mass is mounted in a vertically positioned rod member and diamagnetic bearings are associated with the two ends of said rod member thereby to maintain it in essentially frictionless alignment.

6. A three-axis seismometer in accordance with claim 1 wherein said masses have light-obstructing means associated with one end thereof and each of said detecting means comprises a source of radiation and a dual photocell positioned to respond to movement of said light-obstructing means.

7. A three-axis seismometer in accordance with claim 1 wherein said feedback means associated with said first and second masses comprise means to adjust the position of support platform means on which said first and second magnetic field generating means are mounted relative to said diamagnetic masses.

8. A three-axis seismometer in accordance with claim 7 wherein said means to adjust the position of said support platform means comprises piezoelectric crystals interposed between said platform means and base means in contact with the ground, the seismic motion of which is to be sensed.

9. A three-axis seismometer in accordance with claim 1 wherein said feedback means associated with said masses comprises means to force said masses to return to a predetermined position relative to said magnetic field generating means.

10. A three-axis seismometer in accordance with claim 1 wherein said feedback means associated with said masses comprises means to change the flux pattern in the magnetic field generating means whereby said magnetic masses are returned to a predetermined position relative to said magnetic field-generating means.

11. A three-axis seismometer in accordance with claim 1 including recording means adapted to record the seismic motion of each of said masses as a function of said amount of constraint required to contain said relative motion between each of said masses and its magnetic field generating means.

12. A three-axis seismometer, comprising in combination a. first and second horizontally oriented diamagnetic masses arranged to move in directions perpendicular to each other;
b. first and second magnetic field-generating means adapted to support said first and second diamagnetic masses for essentially only axial movement;
c. a third vertically oriented mass;
d. a third magnetic field-generating means adapted to support said third mass for essentially only axial movement;
e. separate detecting means associated with each of said masses adapted to sense relative seismic motion between said mass and said magnetic field generating means and to produce a signal;
f. separate feedback means associated with each of said masses and its respective magnetic field-generating means and adapted to constrain said relative motion between said mass and its associated magnetic field-generating means;
g. separate feedback-actuating means adapted to receive said signal and to actuate said feedback means whereby said relative motion between said mass and its associated magnetic field-generating means is constrained;
h. means to record said signals, which are proportional to said seismic motions, as a function of time;
i. an outer cylindrical housing; and
j. first, second, and third inner cylindrical housings in axial alignment located in connected spaced relationship within said outer cylindrical housing, each of said inner housings containing its respective diamagnetic mass, magnetic field-generating means, detecting means and feedback means.

13. A three-axis seismometer in accordance with claim 12 wherein said feedback means includes means to provide magnetic, electrostatic, inertial or gravitational force to effect the required constraint.

14. A three-axis seismometer in accordance with claim 12 including remotely activatable levelling means associated with said first and second magnetic field-generating means.

15. A three-axis seismometer in accordance with claim 12 wherein said feedback means comprise means to force said masses to return to a predetermined position relative to said magnetic field-generating means.

16. A three-axis seismometer in accordance with claim 15 wherein said force is magnetic.

17. A three-axis seismometer in accordance with claim 12 including period-adjustment coils associated with said third mass and means to supply DC current to said coils.

18. A three-axis seismometer in accordance with claim 12 wherein said feedback means associated with said third mass comprise motor coils connected in series opposition.

19. A three-axis seismometer in accordance with claim 12 wherein said means to record said signals include filter means adapted to filter out unwanted frequencies from said signal.

* * * * *